United States Patent [19]

Yamanaka et al.

[11] Patent Number: 5,405,460
[45] Date of Patent: Apr. 11, 1995

[54] FE-CR-AL ALLOY STEEL SHEET AND PROCESS FOR PRODUCING THE SAME

[75] Inventors: Mikio Yamanaka; Masuhiro Fukaya, both of Futtsu; Keiichi Ohmura, Kitakyushu; Akira Imamura, Kitakyushu; Hiroyuki Tanaka, Kitakyushu; Ryoichi Hisatomi, Kitakyushu, all of Japan

[73] Assignee: Nippon Steel Corporation, Tokyo, Japan

[21] Appl. No.: 146,056

[22] PCT Filed: Mar. 9, 1993

[86] PCT No.: PCT/JP93/00289

§ 371 Date: Nov. 8, 1993

§ 102(e) Date: Nov. 8, 1993

[87] PCT Pub. No.: WO93/18196

PCT Pub. Date: Sep. 16, 1993

[30] Foreign Application Priority Data

Mar. 9, 1992 [JP] Japan .................. 4-050189

[51] Int. Cl.⁶ .................. B22D 11/00; B22B 15/18; C21D 8/02
[52] U.S. Cl. .................. 148/522; 164/476; 164/477; 428/683; 428/685
[58] Field of Search ............ 148/325, 522, 683, 685; 164/476, 477

[56] References Cited

U.S. PATENT DOCUMENTS

| | | | |
|---|---|---|---|
| 4,536,455 | 8/1985 | Maeda et al. | 428/683 |
| 5,045,404 | 9/1991 | Ohmura et al. | 148/325 |
| 5,228,932 | 7/1993 | Shimizu et al. | 148/325 |

FOREIGN PATENT DOCUMENTS

| | | |
|---|---|---|
| 59-30782 | 7/1984 | Japan . |
| 64-83617 | 3/1989 | Japan . |
| 1-287253 | 11/1989 | Japan . |

*Primary Examiner*—Deborah Yee
*Attorney, Agent, or Firm*—Kenyon & Kenyon

[57] ABSTRACT

The present invention aims to prevent the occurrence of flaws in an Fe-Cr-Al alloy steel sheet, thereby improving the yield. In the present invention, a cast slab comprising an outer layer and an inner layer with the concentration of at least one element selected from Cr, Al and REM (REM being at least one element selected from the group consisting of rare earth elements including Y of lanthanoids) in the outer layer being 70% or less of that of the inner layer, is provided, heated, hot-rolled and cold-rolled to produce a steel sheet or a foil material.

7 Claims, No Drawings

FE-CR-AL ALLOY STEEL SHEET AND PROCESS FOR PRODUCING THE SAME

TECHNICAL FIELD

The present invention relates to Fe-Cr-Al alloy steel sheets (including foil materials) free from surface flaws, and a process for producing the same.

BACKGROUND ART

Recently, Fe-Cr-Al alloys have become used more and more in heat resisting applications, such as an outer smoke pipe of an oil stove, an electric heater and a metallic carrier for an automobile catalyst, because of their excellent oxidation resistance.

It is known that oxidation resistance of this alloy is enhanced with increase of Cr and Al concentrations, and that a remarkable improvement in the adhesion of an oxide film serving to maintain the heat resistance can be attained by the addition of a small amount of at least one rare earth element, including Y, to the alloy. For this reason, in recent years, cold-rolled steel products or foil materials have been produced wherein the Cr and Al concentrations were maximized within such a range that the materials are still rollable and, at the same time, rare earth elements including Y were added.

These alloys, however, had a drawback that the producibility of the products from these alloys is poor and the yield decreases with an increase in the heat resistance. In particular, regarding alloys containing rare earth elements including Y, scabs are likely to occur on the surface of steel sheets in the step of hot rolling or cold rolling. The formation of the scabs incurs an increase in the cost of the process for removing the scabs and, in addition, causes a remarkable lowering in the yield.

An object of the present invention is to avoid scabs generation in the step of hot rolling or cold rolling of an Fe-Cr-Al alloy steel having high Cr and Al concentrations with rare earth elements including Y, thereby providing an Fe-Cr-Al alloy steel sheet capable of inhibiting the lowering in yield.

CONSTRUCTION OF INVENTION

In order to attain the object mentioned above, the present invention is characterized in that a cast slab comprising a surface layer and an inner layer with the concentration of at least one element selected from the group consisting of Cr, Al and REM (REM being at least one element selected from the group consisting of Y and rare earth elements (lantanoids) with atomic numbers of 57 to 71) in the surface layer being 70% or less of that of the inner layer is provided, hot-rolled and cold-rolled into an Fe-Cr-Al alloy steel sheet.

Specific examples of methods for producing the cast slab mentioned above include a double layer continuous casting method and a method wherein a REM wire covered with a metal provided so that the covering metal melts within a continuous casting mold at its position of a depth where the surface layer of the slab is solidified is continuously poured into the continuous casting mold at said position. These methods will now be described.

Among ferritic stainless steels, the Fe-Cr-Al alloy steel has inherently poorer hot workability and cold workability and is likely to cause flaws during rolling. Further, in Fe-Cr-Al alloy steels containing REM, these REM elements often segregate in the form of an oxide or a low-melting intermetallic compound or alloy in the vicinity of the surface of a cast slab. This phenomenon in combination with the poor hot workability and cold workability of the matrix gives rise to the formation of scabs starting from the segregates during rolling.

The present inventors have made various studies with a view to avoid these scabs generation and, as a result, have found that the scabs generation can be effectively avoided by one of two techniques, i.e., a technique where the Cr or Al concentration of the surface of the cast slab is lowered to improve the hot workability and cold workability of the surface layer and a technique where the average concentration of REM in the surface layer portion is lowered to eliminate the segregation of the REM elements in the surface layer portion of the cast slab. It is a matter of course that the resultant steel sheets or foil materials have concentration distributions of Cr, Al, REM or other elements in the direction of sheet thickness. Therefore, heat treatment should be carried out after the production of final products or during working of these steel sheets to diffuse these elements so that the concentration distributions are reduced to such an extent as will not be detrimental to the oxidation resistance.

Heat treatment conditions should be properly determined depending upon the concentration distribution of compositions in the direction of thickness of the steel sheet before the heat treatment and an environment in which the steel sheet is used.

BEST MODE FOR CARRYING OUT THE INVENTION

The best mode for carrying out the invention will now be described in more detail.

At the outset, the reason for the limitation of chemical compositions of the inner layer of the steel of the present invention will now be described in detail.

C, Si and Mn are unavoidable impurities of the steel of the present invention. When the C, Si and Mn contents exceed the respective upper limits, i.e., 0.03%, 0.5% and 1% (all "%" hereinafter used in connection with chemical compositions being "% by weight"), the quality of the hot-rolled sheet is deteriorated, so that the travel of the sheet becomes difficult. In the present invention, Cr and Al are fundamental elements, and Cr serves to ensure the oxidation resistance of the steel of the present invention. When the Cr content is less than 9%, no satisfactory oxidation resistance can be attained. On the other hand, when it exceeds 26%, the quality of the steel is significantly deteriorated, which renders rolling of the steel difficult. For this reason, Cr is added in an amount in the range of from 9 to 26%.

Al is a fundamental element that is indispensable to the present invention and serves to form an alumina film at a high temperature to maintain the oxidation resistance of the steel. When the Al content is less than 2%, no satisfactory oxidation resistance is attained. On the other hand, when it exceeds 6%, the toughness of the hot-rolled sheet is deteriorated, so that the travel of the steel sheet becomes difficult. For this reason, the Al content is limited to 2 to 6%. REM is added in a very small amount for improving the adhesion of the alumina film. When the total content of REM is less than 0.01%, no satisfactory effect can be attained by the addition of REM. On the other hand, when the total content of REM exceeds 0.2%, not only is the effect saturated but also scabs are likely to occur during hot rolling even when the Al concentration of the outer layer is 70% or less of that of the inner layer. For this reason, the amount of Al added is limited to 0.01 to 0.2%.

Ti, Nb and Zr are optionally added for the purpose of improving the toughness of the hot-rolled sheet, and Nb and Zr serve also to improve the high-temperature strength of the steel. When the total content of these elements is less than 0.01%, no satisfactory effect can be attained by the addition of these elements. On the other hand, when it exceeds 0.6%, the toughness of the hot-rolled sheet is unfavorably deteriorated. For this reason, the total amount of these added elements is limited to 0.01 to 0.6%.

Chemical compositions constituting the outer layer of the steel of the present invention will now be described. Among the chemical compositions constituting the outer layer, at least one composition selected from the group consisting of Cr, Al and REM is regulated to a concentration of 0 to 70% of the concentration of these compositions in the inner layer.

This is because no satisfactory effect of reducing the scab on the surface of a thin sheet can be attained when the above-described concentration exceeds 70%.

The production process according to the present invention will now be described.

At the outset, an embodiment of casting of a slab will be described.

A molten steel for constituting the inner layer and a molten steel for constituting the outer layer are separately produced by the melt process, poured respectively into two divided vessels of a tundish of continuous casting equipment and simultaneously cast in a mold provided just under the tundish. In this case, the casting rates of respective molten steels are determined in such a manner that the molten metals for respective layers are cast in predetermined amounts. For example, when the molten metal for the inner layer and the molten metal for the outer layer is cast in an amount ratio of 4:1, the molten metal for the inner layer may be cast at a rate 4 times higher than that of the molten metal for the outer layer. In this case, when the opening of a fountain leading to the mold is provided at a position having a small distance from the surface of the molten metal for the outer layer and at a position having a large distance from the surface of the molten metal for the inner layer, the molten steel for the inner layer is solidified mainly inside the cast slab while the molten metal for the inner layer is solidified mainly outside the cast slab.

Thus, a double layer cast slab of an Fe-Cr-Al alloy is continuously cast.

According to another embodiment of casting of a cast slab, a molten steel having chemical compositions with a REM concentration of 70% or less is cast as a molten steel for an outer layer in a mold of conventional casting equipment, and a wire formed by covering REM, for example, Y, with a carbon steel or a stainless steel is continuously supplied into the mold at a position below the surface of the molten steel where the surface layer of the slab is solidified to form a shell having a thickness of 5 to 15 mm. The covering material and Y of the wire are melted at that position to add a given amount of Y, thereby forming a molten steel for the inner layer.

The reason why the position where the wire is melted is specified to be one where the surface layer of the slab is solidified to form a shell having a thickness of 5 to 15 mm is that when the distance is less than 5 mm, the inner layer is exposed in the stage of grinding the surface layer of the slab while when the distance exceeds 15 mm, the additive from the wire often remains unmelted.

Among the REM elements, rare earth elements with atomic numbers of 57 to 71 (lanthanoids) have a relatively low melting point, so that they, as such, can be fabricated into an additive wire. On the other hand, in the case of Y, since the melting point is as high as 1,522° C., it is preferred to lower the melting point to 1,000° C. or below by alloying Y with Ni, Fe, Cu or other metal.

Further, with respect to the covering material for constituting the wire, the material (for example, a carbon steel or a stainless steel) and thickness should be determined by a preliminary test, a calculation, etc., by taking various factors, such as molten steel temperature, casting rate, addition rate of the wire and diameter of the wire, into consideration. In this case, the carbon steel is hard to melt, while the stainless steel is easy to melt. Therefore, the melting time can be regulated by selecting the material. The material should be selected in such a manner that inclusion of elements from the covering material is not substantially detrimental to the quality of the base material.

After a slab is cast by the above-described method, it is heated in the temperature range of from 1,100° to 1,300° C. and hot-rolled. When the slab heating temperature is below 1,100° C., the hot deformation resistance is so high that it becomes difficult to effect hot rolling. On the other hand, when it exceeds 1,300° C., the slab sags within the heating furnace, which renders the operation of the furnace difficult. Further, even though the slab is heated at such a temperature, since the slab has an outer layer having a thickness of 5 to 15 mm, the homogenization of the concentration distribution between the outer layer and the inner layer does not occur.

After the completion of the hot rolling, the hot-rolled sheet is cold-rolled to form a thin sheet or a foil material.

EXAMPLES

Example 1

Molten steels A and B having compositions specified in % by weight in Table 1 were provided by the melt process, and the two molten steels were poured respectively into two divided vessels of a tundish of continuous casting equipment and simultaneously cast in one mold through fountains from the respective vessels. The two molten steels, i.e., A and B, were cast in a cast rate ratio of 5:1, and the openings of fountains for the molten steels A and B were provided respectively at positions of 400 mm and 100 mm from the surface of the molten steels. The molten steel A was solidified mainly inside the cast slab, while the molten steel B was solidified mainly in the outer layer portion. Ln (lanthanoid: generic term for rare earth elements with atomic numbers 57 to 71) in the molten A is oxidized also in the molten steel, and the amount thereof decreases with time. For this reason, the degree of sealing of the tundish was enhanced, the tundish was filled with inert gas, and Ln was added at a constant rate through an introduction pipe having an opening near the inlet of the casting pipe of the tundish.

The resultant cast slabs had a size of 250 mm in thickness and 1,080 mm in width, and the Cr, Al and Ln contents of a portion extending from the surface to 5 mm below the surface was found by analysis to be 16.7%, 3.6% and 0.01%, respectively.

For comparison, 120 tons of a molten steel having a composition specified in C of Table 1 was cast into a slab having a thickness of 250 mm and a width of 1,080 mm by the conventional casting process.

TABLE 1

| Molten steel | C | Si | Mn | Cr | Al | Ti | Ln | N |
|---|---|---|---|---|---|---|---|---|
| A | 0.010 | 0.22 | 0.35 | 21.8 | 6.05 | 0.04 | 0.095 | 0.007 |
| B | 0.005 | 0.21 | 0.43 | 11.1 | 0.07 | 0.09 | — | 0.004 |
| C | 0.008 | 0.25 | 0.31 | 19.9 | 5.0 | 0.05 | 0.09 | 0.009 |

Note)
Ln represents the total content of lanthanoids. In this case, the Ln comprises 20% of La and 60% of Ce with the balance consisting of Pr, Nd, Pm and Sm.

The surface of the cast slabs provided by the two above-described methods was ground by about 3 mm, and the cast slabs were then heated to 1,200° C. and hot-rolled into hot-rolled coils having a sheet thickness of 4 mm. These hot-rolled coils were rolled by a conventional cold rolling process into cold-rolled sheets having a thickness of 1 mm. In the steel sheets provided from the above-described two slabs, all the 11 coils by a double layer casting process using the molten steels A and B had no significant scab, and the rolling could be successfully effected. By contrast, when the molten metal C alone was cast, 9 out of 11 coils had large and small scabs. Small scabs were removed by surface grinding, and large scabs were removed by cutting the steel sheet, which gave rise to a marked lowering in the yield.

The above-described cold-rolled steel sheets were further rolled into foils having a thickness of 50 μm, fabricated into honeycombs and subjected to vacuum brazing at 1,200° C. for about 10 min to provide metallic carriers. A part of the brazed honeycomb was subjected to embedding and polishing, and the distribution of ingredients in the section was determined by EPMA. As a result, it was found that, even in the honeycomb provided by using continuous double layer casting of the molten metals A and B, heterogeneous distribution of Cr, Al and Ln in the direction of the sheet thickness was eliminated and the distribution became homogeneous. Further, the honeycomb was cut and subjected to an oxidation resistance test in air under conditions of 1,100° C. and 200 hr. The honeycomb provided using double layer casting also exhibited good oxidation resistance although a few abnormal oxide spots were observed at the brazed portion, and compared favorably with the honeycomb comprising a foil provided from the slab produced by single casting of the molten metal C also in terms of the oxidation resistance.

Example 2

120 tons of a molten steel D having a composition specified in % by weight in Table 2 was provided by the melt process and cast into 11 cast slabs having a thickness of 250 mm and a width of 1,080 mm with conventional continuous casting equipment. Among the alloying ingredients, Y was added to a mold by the following method. Specifically, since Y, as such, has a high melting point of 1,522° C., there is a possibility of the melting thereof becoming unsatisfactory. For this reason, an alloy of 30%Ni-70%Y was prepared to lower the melting point to 1,000° C. or below. The alloy was pulverized, and the powder was packed into a SUS304 pipe having a diameter of 6 mm and a thickness of 0.2 mm to provide a wire containing Y that was then supplied at a rate of 12 m per min perpendicularly to the surface of the molten steel in the vicinity of the center thereof in the mold so as to cause Y to melt at a position of 10 mm in terms of the thickness of the slab surface layer.

In this position, the surface layer portion of the continuously cast slab is in the process of solidification, and Y is distributed mainly in the inner layer portion of the cast slab still remaining melted. In fact, the Y content found by analysis of a chip extracted from a position of 5 mm in the surface layer of the cast slab was 0.03%.

For comparison, 120 tons of a molten steel E having a composition specified in Table 2 was cast by the conventional continuous casting process into a cast slab having the same size as that described above. In this case, Y was added by a method wherein the degree of sealing of the tundish was enhanced, the tundish was filled with inert gas and an alloy mass of 50%Fe-50%Y was placed in the tundish. The surface layer portion of both the cast slabs D and E was ground by 3 mm, and the slabs were then hot-rolled and cold-rolled in the same manner as that of Example 1.

With respect to the occurrence of flaws in both the steel sheets, since all the coils started from the cast slab E gave rise to a number of microscabs during the hot rolling, the hot-rolled sheet was pickled and subjected to heavy surface grinding by 50 μm with a coil grinder and then cold-rolled. By contrast, the coil started from the cast slab D gave rise to no scabs over the whole length of the coil, and surface grinding after pickling to such an extent as will remove the remaining scale sufficed for the transfer to the subsequent step.

TABLE 2

| Molten steel | C | Si | Mn | Cr | Al | Nb | Y | N |
|---|---|---|---|---|---|---|---|---|
| D | 0.006 | 0.20 | 0.31 | 20.1 | 5.0 | 0.12 | 0.03/0.08* | 0.008 |
| E | 0.007 | 0.23 | 0.34 | 20.3 | 4.9 | 0.10 | 0.07 | 0.009 |

Note)
*: Chemical compositions of surface layer/inner layer.

The cold-rolled sheets produced by both the processes were rolled into 50 μm-thick foils that were then fabricated into metallic carriers in the same manner as that of Example 1. Honeycombs derived from both the molten steels D and E and cut out from these metallic carriers exhibited good oxidation resistance in air under conditions of 1,100° C. and 200 hr. Further, also in the foil derived from the molten steel D, it was confirmed by EPMA analysis that the heterogeneous concentration distribution of Y in the direction of sheet thickness was eliminated and the distribution became substantially homogeneous.

Industrial Applicability

The present invention provides an Fe-Cr-Al alloy steel sheet free from the occurrence of flaws from an Fe-Cr-All alloy steel liable to experience flaws and a very useful production process which can improve the production efficiency and yield. Therefore, the present invention can greatly contribute to a lowering in cost and stable supply of materials for environmental protection.

We claim:

1. An Fe-Cr-Al alloy steel sheet comprising: an internal layer comprised of, in terms of % by weight, 0.03% or less of C, 0.5% or less of Si, 1% or less of Mn, 9 to 26% of Cr, 2 to 6% of Al and 0.01 to 0.2% in total of at least one member selected from the group consisting of Y and rare earth elements with atomic numbers of 57 to 71 (hereinafter referred to as "REM") with the balance consisting essentially of Fe; and an outer layer having the same composition as the internal layer, except that the concentration of at least one element selected from the group consisting of Cr, Al and REM is in the range of from 0 to 70% of that of the internal layer.

2. An Fe-Cr-Al alloy steel sheet according to claim 1, which further comprises, in terms of % by weight, 0.01 to 0.6% in total of at least one element selected from the group consisting of Ti, Nb and Zr.

3. A process for producing an Fe-Cr-Al alloy steel sheet, comprising the steps of: preparing a cast slab comprising an internal layer comprised of, in terms of % by weight, 0.03% or less of C, 0.5% or less of Si, 1% or less of Mn, 9 to 26% of Cr, 2 to 6% of Al and 0.01 to 0.2% of REM with the balance consisting essentially of Fe and an outer layer having the same composition as the internal layer, except that the concentration of at least one element selected from the group consisting of Cr, Al and REM is in the range of from 0 to 70% of that of the internal layer; heating said cast slab in the temperature range of from 1,100° to 1,300° C. and hot-rolling; and continually cold-rolling.

4. A process for producing an Fe-Cr-Al alloy steel sheet, comprising the steps of: pouring two molten steels respectively having compositions for said internal layer and said outer layer respectively into two divided vessels of a tundish in continuous casting equipment; simultaneously casting said molten steels in one mold through fountains from said respective vessels with the casting of the one molten metal being different from that of the other molten metal in the casting rate and the position of an opening of a casing pipe, thus providing a double layer cast slab comprising an inner layer and an outer layer; heating said cast slab in the temperature range of from 1,100° to 1,300° C. and hot-rolling; and continually cold-rolling.

5. A process for producing an Fe-Cr-Al alloy steel sheet, comprising the steps of: pouring into a mold in continuous casting equipment a molten steel having the same composition as that for said inner layer, except that the concentration of REM is regulated to 0 to 70% of that in the inner layer; continuously supplying a wire comprising REM covered with a covering material into said mold at a position below the surface of the molten steel where the surface layer of a slab is solidified to form a shell having a thickness of 5 to 15 mm; melting said wire at that position, thus providing a double layer cast slab comprising an inner layer and an outer layer; heating said cast slab in the temperature range of from 1,100° to 1,300° C. and hot-rolling; and continually cold-rolling.

6. The process according to claim 5, wherein said covering material comprises a carbon steel or a stainless steel.

7. The process according to claim 5, wherein said wire is formed by covering an Y alloy powder having a melting point of 1,000° C. or below with a carbon steel or a stainless steel and continuously supplied into the molten metal.

* * * * *